(12) United States Patent
Stephens et al.

(10) Patent No.: US 11,789,433 B2
(45) Date of Patent: Oct. 17, 2023

(54) SYSTEMS AND METHODS FOR COORDINATING INSERTION AND/OR REMOVAL OF REDUNDANT INPUT/OUTPUT (I/O) COMPONENTS

(71) Applicant: ROCKWELL AUTOMATION TECHNOLOGIES, INC., Mayfield Heights, OH (US)

(72) Inventors: Alex W. Stephens, Painesville, OH (US); Joshua B. Boroff, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 52 days.

(21) Appl. No.: 17/522,669

(22) Filed: Nov. 9, 2021

(65) Prior Publication Data

US 2023/0141240 A1 May 11, 2023

(51) Int. Cl.
*G05B 19/418* (2006.01)

(52) U.S. Cl.
CPC ... *G05B 19/41865* (2013.01); *G05B 19/4183* (2013.01); *G05B 19/41835* (2013.01); *G05B 19/41885* (2013.01)

(58) Field of Classification Search
CPC .................................................. G05B 19/418
USPC ......................................................... 700/100
See application file for complete search history.

(56) References Cited

U.S. PATENT DOCUMENTS

| | | | |
|---|---|---|---|
| 11,564,324 B2 * | 1/2023 | Wrobel | H05K 7/1477 |
| 2014/0239923 A1 | 8/2014 | Alley | |
| 2015/0045027 A1 * | 2/2015 | Ianev | H04W 4/50 |
| | | | 455/435.1 |
| 2016/0295415 A1 * | 10/2016 | Yumoto | G06Q 50/22 |
| 2020/0050523 A1 | 2/2020 | Pawlowski et al. | |
| 2020/0333758 A1 * | 10/2020 | Kretschmann | H05K 7/1464 |

FOREIGN PATENT DOCUMENTS

EP      1291744 B1      4/2007

OTHER PUBLICATIONS

Rockwell Automation, "1715 Redundant I/O—Bulletin 1715," Dec. 1, 2010, 4 pages.
Extended European Search Report for Application No. 22205550.1 dated Apr. 21, 2023, 13 pages.

\* cited by examiner

*Primary Examiner* — Hien D Khuu
(74) *Attorney, Agent, or Firm* — Fletcher Yoder, P.C.

(57) ABSTRACT

A non-transitory, computer-readable medium includes computer-executable instructions that, when executed, by one or more processors associated with a first input/output (I/O) component in an industrial automation system, cause the processors to perform operations. The first I/O component may operate in a single duplex ("suplex") mode of operation. The operations include detecting a second I/O component in the industrial automation system, determining that a first hardware configuration, a first software configuration, or both, associated with the first I/O component is compatible with a second hardware configuration, a second software configuration, or both, associated with the second I/O component, and reconfiguring the first I/O component to operate in a duplex mode of operation.

11 Claims, 6 Drawing Sheets

SYSTEMS AND METHODS FOR COORDINATING INSERTION AND/OR REMOVAL OF REDUNDANT INPUT/OUTPUT (I/O) COMPONENTS

BACKGROUND

The disclosure generally relates to coordinating modes of operation of redundant input/output (I/O) components. More particularly, embodiments of the present disclosure are related to inserting and/or removing I/O components from an industrial automation system and coordinating reconfiguration of one or more of the I/O components in order to maintain communication with or control of one or more I/O devices in the industrial automation system.

An industrial automation system may be used to provide automated control of one or more actuators. For example, a controller of the industrial automation system may output a conditioned power signal to an actuator to control movement of the actuator. Input/output (I/O) components may facilitate communication between the controller and the actuator or other devices within the industrial automation system. In certain industrial automation systems, redundant I/O components may be utilized to maintain communication between the controller and the actuator or the other devices. However, maintenance of the redundant I/O components may require removal of a particular I/O component in a pair of redundant I/O components and insertion of a replacement I/O component. Such maintenance may disrupt the communication between the controller and the actuator or the other devices. Thus, it may be desirable to facilitate maintenance or replacement of redundant I/O components in an industrial automation system such that disruption of communication between a controller and other devices in the industrial automation system is minimized.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an input/output (I/O) system of an industrial automation system includes a terminal block, a first I/O component, and a second I/O component. The terminal block include terminals that may couple to respective I/O components. The first I/O component and the second I/O component are removably coupled to a set of terminals. The first I/O component and the second I/O component operate in a duplex mode of operation. The first I/O component may perform a first set of operations that include receiving a signal indicative of an unlocking of the first I/O component from the terminal block, generating a schedule for disengaging the first I/O component from the terminal block, transmitting the schedule to the second I/O component, and disengaging from the set of terminals based on the schedule. The second I/O component may perform a second set of operations that include receiving the schedule from the first I/O component and reconfiguring the second I/O component to operate in a single duplex ("suplex") mode of operation.

In another embodiment, a method includes receiving, by a first input/output (I/O) component removably coupled to a terminal block, a signal indicative of an unlocking of the first I/O component from the terminal block; generating, by the first I/O component, a schedule for disengaging the first I/O component from the terminal block; transmitting, by the first I/O component, the schedule to a second I/O component; and disengaging, by the first I/O component, from a set of terminals associated with the terminal block based on the schedule. The method also includes reconfiguring, by the second I/O component, an operational configuration associated with the second I/O component to a single duplex ("suplex") mode of operation based on the schedule.

In yet another embodiment, a non-transitory, computer-readable medium includes computer-executable instructions that, when executed, by one or more processors associated with a first input/output (I/O) component in an industrial automation system, cause the processors to perform operations. The first I/O component may operate in a single duplex ("suplex") mode of operation. The operations include detecting a second I/O component in the industrial automation system, determining that a first hardware configuration, a first software configuration, or both, associated with the first I/O component is compatible with a second hardware configuration, a second software configuration, or both, associated with the second I/O component, and reconfiguring the first I/O component to operate in a duplex mode of operation.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, redundant I/O components within an industrial automation system may be utilized to maintain communication with and control of one or more devices by a connection originator (e.g., a controller) in the industrial automation system. However, maintenance of the redundant I/O components may require removal of a particular I/O component in a pair of redundant I/O components and/or insertion of a replacement I/O component. Such maintenance may disrupt control of the operation of the devices by the connection originator.

Accordingly, embodiments of the present disclosure are generally directed to seamlessly switching between different modes of operation associated with partner I/O channels associated with a pair of redundant I/O components in an industrial automation system in a seamless (e.g., bumpless) manner. For example, each redundant I/O component of the pair of redundant I/O components may include one or more isolated channels. Each isolated channel in a first redundant I/O component of the pair of redundant I/O components has a partner isolated channel in a second redundant I/O component of the pair of redundant I/O components. Each pair of partner isolated channels between the pair of redundant I/O components typically operate in a duplex mode of operation such that each pair of partner isolated channels coordinate performance of a particular operation to maintain communication with or control of a respective device by the connection originator in the industrial system. However, if a fault occurs on a first channel of the pair of partner isolated channels, the second channel of the pair of partner isolated channels that did not experience the fault may switch to a suplex mode of operation (e.g., a single duplex mode of operation) such that the second channel performs the particular operation without coordinating with the first channel.

In this way, the second channel may take over full performance of the operation while the first channel undergoes maintenance. Additionally, because each channel in each redundant I/O component is isolated from one another, other pairs of partner isolated channels between the pair of redundant I/O components may continue to operate in the duplex mode of operation.

Further, maintenance of the redundant I/O component with the faulty channel (e.g., the first redundant I/O component of the pair of redundant I/O components) may require removal of the first redundant I/O component from the industrial automation system. For example, a maintenance technician may unlock the first redundant I/O component from a base (e.g., a removable terminal block) in the industrial automation system via an actuator in order to remove the first redundant I/O component. After receiving an indication that the first redundant I/O component is being removed from the base but before the first redundant I/O component has been physically removed from the base, the first redundant I/O component may initiate a reconfiguration process associated with the other pairs of partner isolated channels among the pair of redundant I/O components. In particular, the isolated channels of each pair of partner isolated channels associated with the second redundant I/O component may switch their respective modes of operation to the suplex mode of operation such that the isolated channels of the second redundant I/O component perform their respective operations without coordinating with their respective partner channels in the first redundant I/O component. In this way, the reconfiguration process may facilitate a seamless (e.g., bumpless) transition between the duplex mode of operation to the suplex mode of operation of each isolated channel of the second redundant I/O component such that any disruption in the communication with or control of devices in the industrial automation system by the connection originator is minimized when removing the first redundant I/O component from the industrial automation system.

As mentioned above, a maintenance technician may insert a third I/O component (e.g., a replacement I/O component) into the base (e.g., a removable terminal block) to replace the first redundant I/O component in the pair of redundant I/O components. For example, after receiving an indication that the replacement redundant I/O component is being inserted into the base, the replacement redundant I/O component may initiate a second reconfiguration process associated with each pair of partner isolated channels between the replacement redundant I/O component and the second redundant I/O component. In particular, the isolated channels of each pair of partner isolated channels between with the replacement redundant I/O component and the second redundant I/O component may switch to a duplex mode of operation such that each pair of partner isolated channels coordinate performance of a particular operation to maintain communication with or control of a respective device by the connection originator in the industrial system. In this way, the second reconfiguration process may facilitate a seamless (e.g., bumpless) transition between the suplex mode of operation of each isolated channel of the second redundant I/O component to the duplex mode of operation of each pair of partner isolated channels between the second redundant I/O component and the replacement redundant I/O component when inserting the replacement I/O component into the industrial automation system.

Figure 1:
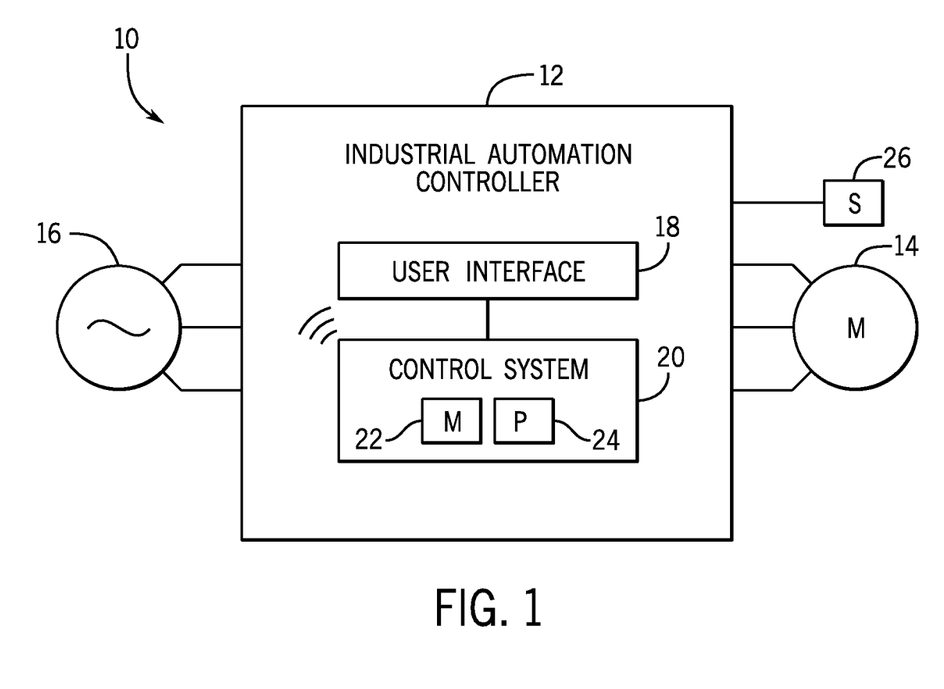
FIG. 1 is a schematic view of industrial automation system, in accordance with an embodiment.

By way of introduction, FIG. 1 is a schematic view of an industrial automation system 10. As shown, the industrial automation system 10 includes a controller 12 (i.e., a connection originator) and an actuator 14 (e.g., a motor). The industrial automation system 10 may also include, or be coupled to, a power source 16. The power source 16 may include a generator, a battery (or other power storage device), or an external power grid. Though the controller 12 shown in FIG. 1 is a stand-alone controller 12, in more complex industrial automation systems 10, one or more controllers 12 may be grouped together with other components in a motor control center (MCC) to control multiple actuators. In the instant embodiment, the controller 12 includes a user interface 18, such as a human machine interface (HMI), and a control system 20, which may include a memory 22 and a processor 24.

The control system 20 may be programmed (e.g., via computer readable code or instructions stored on the memory 22 and configured to be executed by the processor 24) to provide signals for driving the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices (such as sensors 26). The programming of the control system 20 may be accomplished through software configuration or firmware code that may be loaded onto the internal memory 22 of the control system 20 or programmed via the user interface 18 of the controller 12. The control system 20 may respond to a defined set of operating parameters. The settings of the various operating parameters determine the operating characteristics of the controller 12. For example, various operating parameters may determine the speed or torque of the motor 14 or may determine how the controller 12 responds to the various external inputs (such as from sensors 26). As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) like control programming, and the like.

In some embodiments, the controller 12 may be communicatively coupled to one or more sensors 26 for detecting operating temperatures, voltages, currents, pressures, flow rates, etc. within the industrial automation system 10. With feedback data from the sensors 26, the control system 20 may keep detailed track of the various conditions under which the industrial automation system 10 may be operating. For example, the feedback data may include conditions such as actual motor speed, voltage, frequency, power quality, alarm conditions, etc.

Figure 2:
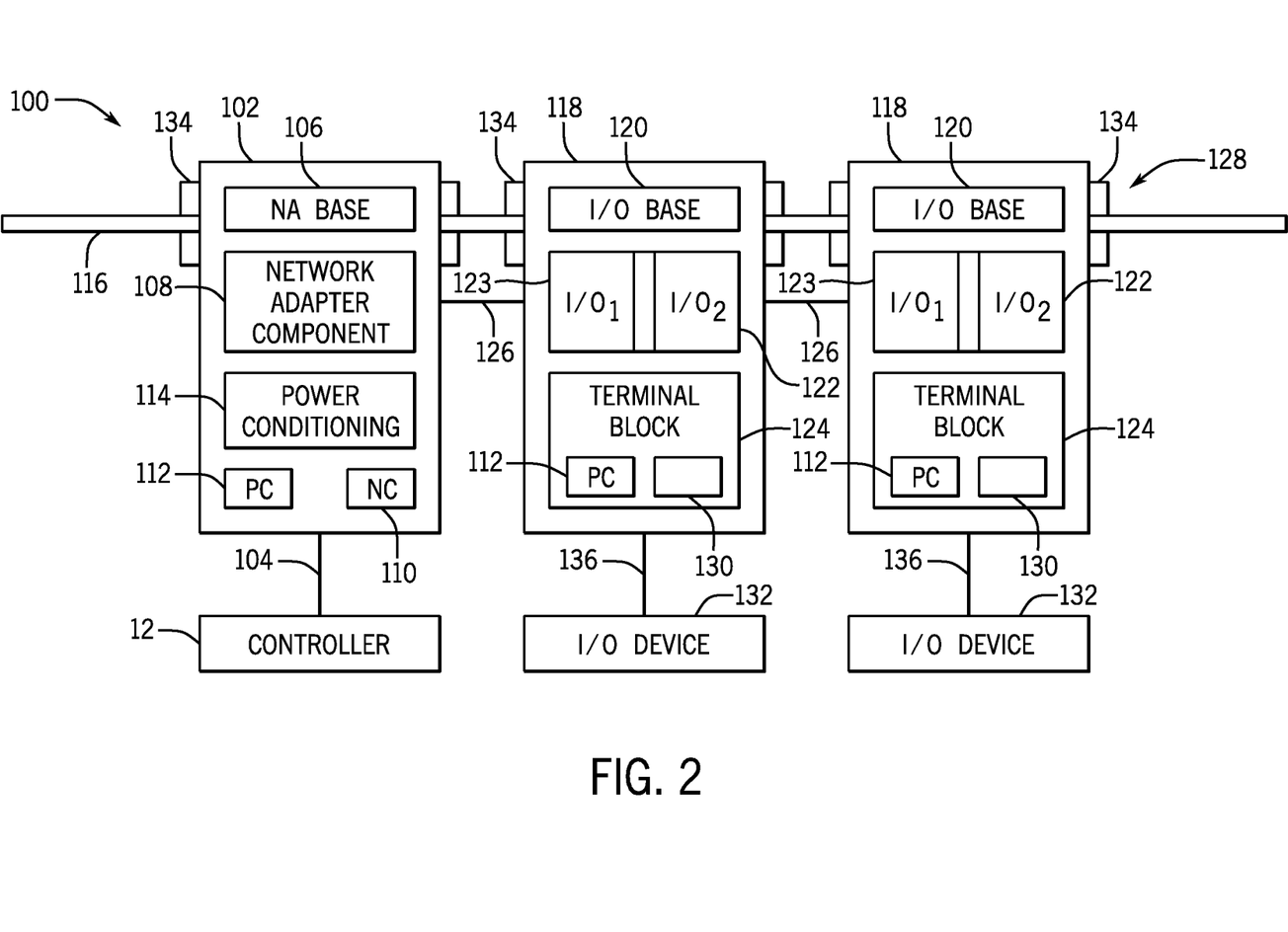
FIG. 2 is a schematic view of a modular input/output (I/O) system that may be utilized within the industrial automation system of FIG. 1, in accordance with an embodiment.

FIG. 2 is a schematic view of a modular input/output (I/O) system 100 for the industrial automation system 10 shown in FIG. 1. As illustrated, the modular I/O system 100 includes a network adapter 102 that is in communication with a controller 12 (i.e., a connection originator) via a network 104 (e.g., an Ethernet/IP network or other industrial automation network) such that the network adapter 102 receives data from, transmits data to, and otherwise communicates with the controller 12. For example, the controller 12 may be a programmable logic controller or a PLC. The network adapter 102 includes a network adapter base 106, a network adapter component 108 (e.g., a network adapter module), a network connector 110, and a power connector 112. In some embodiments, the network adapter 102 may also include power conditioning circuitry 114. The network adapter base 106 may be mounted (e.g., permanently or removably coupled) to a rail or plate 116. The network adapter component 108 may be removably coupled to the network adapter base 106 and include communication circuitry for communication with the controller 12 via the network connector 110 and the network 104 and/or communication with other I/O banks 118 coupled to the rail or panel 116. As such, the network adapter component 108 may be configured to manage communication within the I/O system (e.g., between the network adapter 102 and the various other I/O banks 118), and/or between the I/O system 100 and various other components of the industrial automation system including, for example, the controller 12. The power connector 112 may be configured to receive power from a power source (which may or may not be the same power source 16 shown in FIG. 1) that supplies power to the network adapter 102 and one or more other I/O banks 118 coupled to the rail or panel 116. In embodiments that have power conditioning circuitry 114, the power conditioning circuitry 114 may be configured to condition the power received from the power source 16 via the power connector 112 by amplifying the power signal, attenuating the power signal, stepping the power signal up or down, inverting the power signal, applying one or more filters to the power signal, converting a direct current (DC) power signal to alternating current (AC) power, converting an AC power signal to DC power, and so forth.

Each of the one or more other I/O banks 118 may include an I/O base 120, one or more I/O components 122, 123 (e.g., an I/O module), and a terminal block 124 (e.g., removable terminal block or "RTB"). The I/O base 120 may also be mounted (e.g., permanently or removably coupled) to the rail or panel 116. The other I/O banks 118 may be sequentially communicatively coupled to one another and to the network adapter 102 via a multi-contact connector 126, forming a backplane 128, and enabling communication with the controller 12 and one or more other I/O devices 132 via the I/O wiring 136. The I/O components 122, 123 may be removably coupled to the I/O base 120 (e.g., via the terminal block 124), thus enabling communication between the I/O components 122, 123 and the controller 12 via the network adapter 102 and the backplane 128.

The I/O components 122, 123 may be configured to perform one or more specialized industrial automation input/output functions such as DC input, DC output, AC input, AC output, analog input and/or output, resistance temperature detector (RTD) and/or thermocouple input, an output signal to control an actuator, and so forth. For example, the I/O components 122, 123 may facilitate communication with or control of one or more I/O devices 132 by the controller 12. As illustrated in FIG. 2, the I/O components 122, 123 may operate as a redundant pair of I/O components 122, 123. For example, each I/O component 122, 123 may include one or more isolated channels that has a respective partner isolated channel in the other I/O component 122, 123. Each pair of partner isolated channels between the pair of I/O components may operate either in a duplex mode of operation or a single duplex (i.e., "suplex") mode of operation. In the duplex mode of operation, one or more pairs of partner isolated channels between the I/O components 122, 123 may coordinate to perform one or more respective specialized industrial automation input/output operations. In the suplex mode of operation, one or more isolated channels in each I/O component 122, 123 may perform the respective specialized industrial automation input/output operations without coordinating with a partner isolated channel. Additional details regarding the operation of the isolated channels in the I/O components 122, 123 are discussed herein with respect to FIG. 3.

Referring back to FIG. 2, the terminal blocks 124 may include cage clamps, spring clamps, push-in terminals, screw terminals, or other wiring connectors 130 configured to couple to field wires associated with a field I/O device 132 (e.g., a sensor, flow meter, switch, probe, thermocouple, RTD, encoder, actuator, and so forth) associated with a process or machine being controlled by the controller 12. In some embodiments, the terminal block 124 may be a separate structure that is assembled and coupled to the I/O base 120. In other embodiments, the terminal block 124 may be integral to the I/O base 120. Different embodiments/configurations of terminal blocks 124 may be utilized, depending upon the particular configuration suited for the field device wiring connectors 130 (e.g., having different common terminals, ground connections, voltage supply terminals, etc.). The I/O banks 118 of terminal block 124 may also include a power connector 112 to receive power from a power source (which may or may not be the same power source 16 shown in FIG. 1) that supplies power to the I/O bank 118 and/or the I/O devices 132 (e.g., sensors, actuators, etc.) that are communicatively coupled to the I/O bank 118. Each installed I/O component 122, 123 communicates with the field device wiring connectors 130 of the same I/O base 120 to which the I/O component 122, 123 is physically coupled (e.g., via the terminal block 124). Input/output data is provided between the controller 12 and the I/O devices 132 connected to the corresponding I/O base 120 via the backplane 128, the network adapter component 108, and the I/O components 122, 123. In some embodiments, the network adapter 102 and I/O banks 118 may be coupled to the rail or panel 116 via respective backplane switches 134, sometimes called bus interface modules (BIMs), that facilitate electrical connections between the various components of the backplane switch 128 (e.g., the network adapter 102, the I/O banks 118, the rail 116, etc.). In some embodiments, the multi-contact connector 126 and the backplane switch 128 may be distinct components. In other embodiments, the functions of the multi-contact connector 126 and the backplane switch 128 may be performed by the same component.

As shown in FIG. 2, the backplane 128 is a circuit that sequentially couples the network adapter 102 and the adjacent I/O banks 118 in a series or a sequential manner through the connectors 126 of the backplane 128 and/or the backplane switch 134. For example, the backplane switches 134 of the adapter 102 and each I/O bank 118 use backplane data communication protocols to establish the above-described backplane circuit 128.

Figure 3:
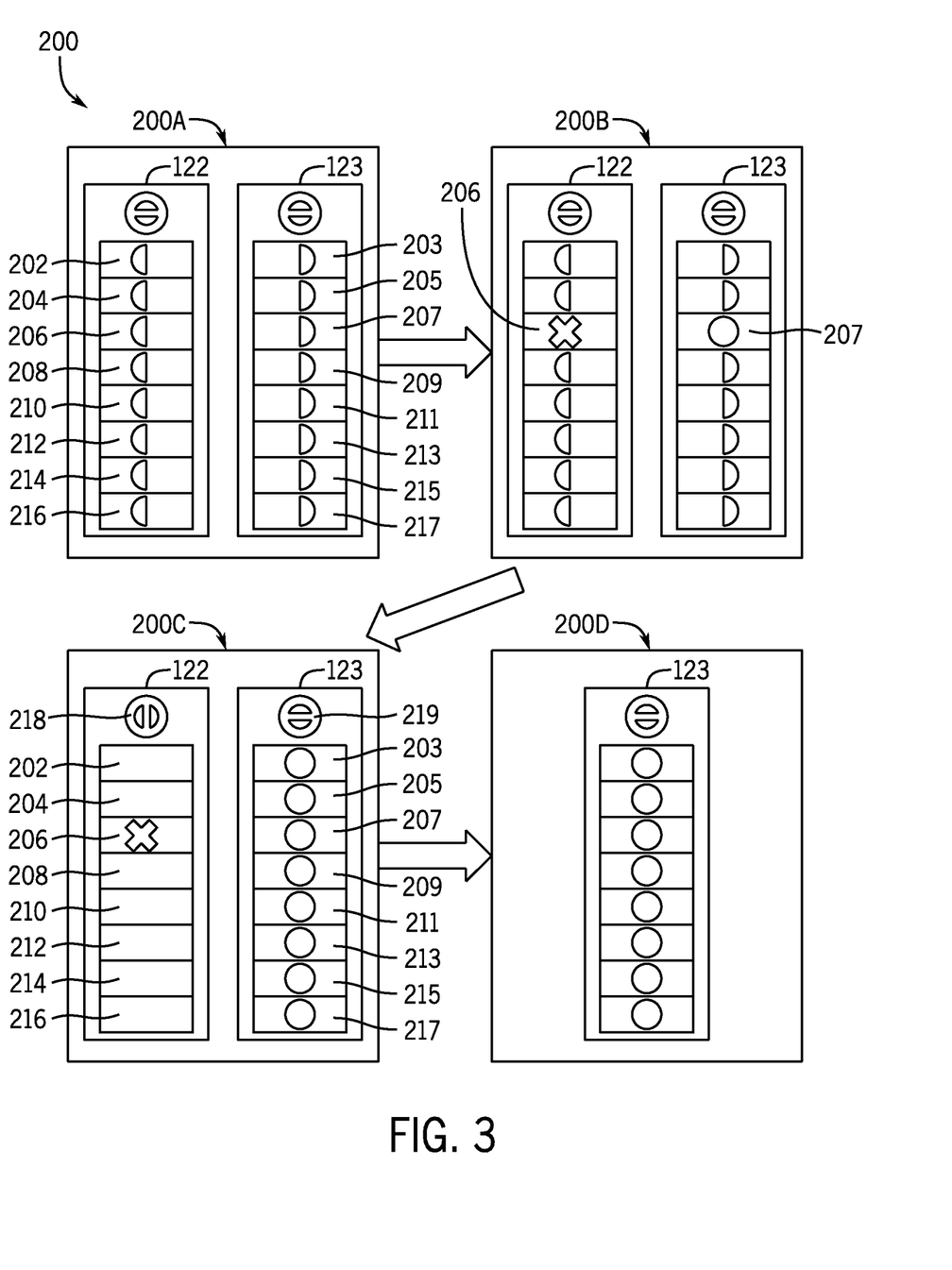
FIG. 3 is a block diagram of a reconfiguration process associated with a pair of redundant I/O components associated with the I/O system of FIG. 2, in accordance with an embodiment.

With the foregoing in mind, FIG. 3 is a block diagram 200 that illustrates a reconfiguration process associated with a pair of redundant I/O components 122, 123 after a first redundant I/O component 122 of the pair of redundant I/O components experiences a fault. As mentioned above, the pair of redundant I/O components 122, 123 may facilitate communication with or control of one or more I/O devices 132 by a connection originator (e.g., the controller 12) in the industrial automation system 10. For example, the first redundant I/O component 122 of the pair of redundant I/O components 122, 123 may include isolated channels 202, 204, 206, 208, 210, 212, 214, 216 while the second redundant I/O component 123 of the pair of redundant I/O components 122, 123 may include isolated channels 203, 205, 207, 209, 211, 213, 215, 217. Although FIG. 3 illustrates that each redundant I/O component 122, 123 includes eight isolated channels, it should be understood that, in other embodiments, each redundant I/O component 122, 123 may have any suitable number of isolated channels. In any case, each isolated channel 202, 204, 206, 208, 210, 212, 214, 26 in the first redundant I/O component 122 has a partner isolated channel 203, 205, 207, 209, 211, 213, 215, 217 in the second redundant I/O component 123. As illustrated in FIG. 3, for example, isolated channel 202 of the first redundant I/O component 122 and isolated channel 203 of the second redundant I/O component 123 are partner isolated channels, isolated channel 204 of the first redundant I/O component 122 and isolated channel 205 of the second redundant I/O component 123 are partner isolated channels, and so on and so forth.

As illustrated in box 200A of FIG. 3, each pair of partner isolated channels (e.g., 202 and 203) between the first redundant I/O component 122 and the second redundant I/O component 123 may operate under a duplex mode of operation to perform a specialized industrial automation input/output operation. Box 200A may correspond to a "normal" state of the pair of redundant I/O components 122, 123 in the industrial automation system 10. For instance, the pair of redundant I/O components 122, 123 may operate under a "normal" state when none of the isolated channels (e.g., 202, 203) of the pair of redundant I/O components 122, 123 have experienced a fault.

In certain embodiments, under the duplex mode of operation, the controller 12 may transmit a command to an I/O device 132 in the industrial automation system 10 via the network adapter 102 and the redundant I/O components 122, 123. In particular, the network adapter 102 may receive the command from the controller 12 and relay the command to both redundant I/O components 122, 123. After each redundant I/O component 122, 123 receives a respective command from the network adapter 102, a pair of partner isolated channels (e.g., 202, 203) between the redundant I/O components 122, 123 may coordinate operation to perform a specialized industrial automation input/output operation that facilitates performance of the command by the I/O device 132. For instance, each partner isolated channel (e.g., 202, 203) may transmit an output signal to the I/O device 132 indicative of the command.

Additionally, or alternatively, the pair of partner isolated channels (e.g., 202, 203) between the redundant I/O components 122, 123 may communicate input data (e.g., sensor data) from the I/O device 132 to the controller 12 via the network adapter 102. For example, each partner isolated channels (e.g., 202, 203) may receive (e.g., listen for) input data from the I/O device 132 and communicate with each other to compare corresponding values within the received input data received by each partner isolated channel (e.g., 202, 203). After the pair of partner isolated channels (e.g., 202, 203) agree on a value to send to the network adapter 102, each partner isolated channel (e.g., 202, 203) of the redundant I/O components 122, 123 transmits a signal to the network adapter 102 indicative of the agreed upon value. The network adapter 102 may then transmit a signal indicative of the received value to the controller 12.

As mentioned above, during operation of each pair of partner isolated channels (e.g., 202, 203) between the redundant I/O components 122, 123, a particular isolated channel (e.g., 206) may experience a fault or otherwise becomes disengaged. For example, an isolated channel may experience a fault due to loss of power, an overload of power, a short in a circuit, a firmware error, or the like. In certain embodiments, the isolated channel may become disengaged if the isolated channel does not have a configuration or the isolated channel has a conflicting configuration with the configuration of its partner isolated channel. As illustrated in box 200B of FIG. 3, in response to the fault experienced by the isolated channel 206 of the redundant I/O component 122, the partner isolated channel 207 in the redundant I/O component 123 may switch to a suplex mode of operation such that the isolated channel 207 in the redundant I/O component performs a specialized industrial automation input/output operation without coordinating with the isolated channel 206 that experienced the fault. In certain embodiments, the isolated channel 207 in the redundant I/O component 123 may receive a signal indicative of the fault in the isolated channel 206 from the isolated channel 206 and/or the redundant I/O component 122. After receiving the signal, the isolated channel 207 may reconfigure itself to function in the suplex mode of operation. As mentioned above, the specialized industrial automation input/output operation may facilitate communication between or control of a I/O device (e.g., 132) by the controller 12. Additionally, because each partner isolated channel (e.g., 202 and 206, 203 and 207) in each redundant I/O component 122, 123 is isolated from one another, the other pairs of isolated channels between the pair of redundant I/O components 122, 123 may continue to operate in the duplex mode of operation.

Thereafter, a maintenance technician may remove the redundant I/O component 122 with the faulty isolated channel 206 during maintenance of the redundant I/O component 122. As illustrated in box 200C of FIG. 3, each redundant I/O component 122, 123 may include an actuator 218, 219 that allows a maintenance technician to unlock the corresponding redundant I/O component 122, 123 from the terminal block 124 or lock the corresponding redundant I/O component 122, 123 into the terminal block 124. In certain embodiments, the maintenance technician may rotate the actuator 218, 219 one-quarter turn to lock or unlock the corresponding redundant I/O component 122, 123 with respect to the terminal block 124. However, it should be noted that, in other embodiments, any other suitable locking mechanism may be utilized to secure the redundant I/O components 122, 123 to the terminal block 124. For example, in some embodiments, a locking tab may be utilized to allow a redundant I/O component 122, 123 to be snap fit to the terminal block 124 or released from the terminal block 124after disengagement of the locking tab.

In any case, as the maintenance technician begins to unlock the redundant I/O component 122 with the fault channel 206 from the terminal block 124, the redundant I/O component 122 may receive a signal indicative of the redundant I/O component being unlocked from the actuator 218. In some embodiments, the actuator 218 may be communicatively coupled to a sensor that continuously or intermittently generates a signal indicative of whether the actuator 218 is a locked or unlocked position. After receiving the signal indicative of the redundant I/O component 122 being unlocked from the actuator 218, the redundant I/O component 122 may trigger a reconfiguration process to switch the remaining isolated channels (e.g., 203, 205, 209, 211, 213, 215, 217) of the redundant I/O component 123 into the suplex mode of operation before the redundant I/O component 122 is removed from the terminal block 124.

In certain embodiments, under the suplex mode of operation, the controller 12 may transmit a command to an I/O device in the industrial automation system 10 via the network adapter 102 and the redundant I/O component 123. In particular, after receiving the command from the controller 12, the network adapter 102 may relay the command to the redundant I/O component 122 with the faulty channel 206 and the redundant I/O component 123. After the redundant I/O component 123 receives the command from the network adapter 102, an isolated channel (e.g., 207) of the redundant I/O component 123 may perform a specialized industrial automation input/output operation that facilitates performance of the command by the I/O device 132. Although the redundant I/O component 122 with the faulty channel 206 receives the command from the network adapter 102, the faulty channel (e.g., 206) of the redundant I/O component 122 does not coordinate performance of the specialized industrial automation input/output operation with the isolated channel (e.g., 207) of the redundant I/O component 123 because the isolated channel (e.g., 207) is operating in the suplex mode of operation. That is, the redundant I/O component 122 may still receive commands from the network adapter 102 to perform specialized industrial automation input/output operations via the faulty channel 206 but the redundant I/O component 122 does not perform the specialized industrial automation input/output operations.

Additionally, or alternatively, the isolated channel (e.g., 207) of the redundant I/O components 123 may communicate input data (e.g., sensor data) from the I/O device 132 to the controller 12 via the network adapter 102. For example, the isolated channel (e.g., 207) may receive (e.g., listen for) input data from the I/O device 132 and transmit a signal indicative of one or more values of the input data to the network adapter 102 without communicating with the redundant I/O component 122 with the faulty channel 206. The network adapter 102 may then transmit a signal indicative of the received values to the controller 12.

After the reconfiguration process of the redundant I/O component 123 completes, the redundant I/O component 122 with the faulty channel 206 may disengage from the terminal block 124. For example, the redundant I/O component 122 may physically decouple from one or more terminals associated with the terminal block 124such that the redundant I/O component 122 is no longer communicating with the network adapter 102 or a corresponding I/O device 132. In this way, the reconfiguration process may facilitate a seamless (e.g., bumpless) transition between the duplex mode of operation by each pair of partner isolated channels (e.g., 202, 203) between the pair of redundant I/O components 122, 123 to the suplex mode of operation by each isolated channel (e.g., 203) in the redundant I/O component 123 not being removed by the technician. As referred to herein, a "bumpless" transition refers to the duration of the reconfiguration process being less than five milliseconds (ms) or the controller 12 not experiencing a loss of communication with the I/O device 132. Additional details regarding the reconfiguration process are described below with respect to FIG. 4. Thereafter, the maintenance technician may remove the redundant I/O component 122 with the faulty channel 206 after the reconfiguration process is complete. As illustrated in box 200D of FIG. 3, the redundant I/O component 122 with the faulty channel 206 has been removed from the terminal block 124, and the redundant I/O component 123 (e.g., each isolated channel of the redundant I/O component 123) is operating in the suplex mode of operation.

Figure 4:
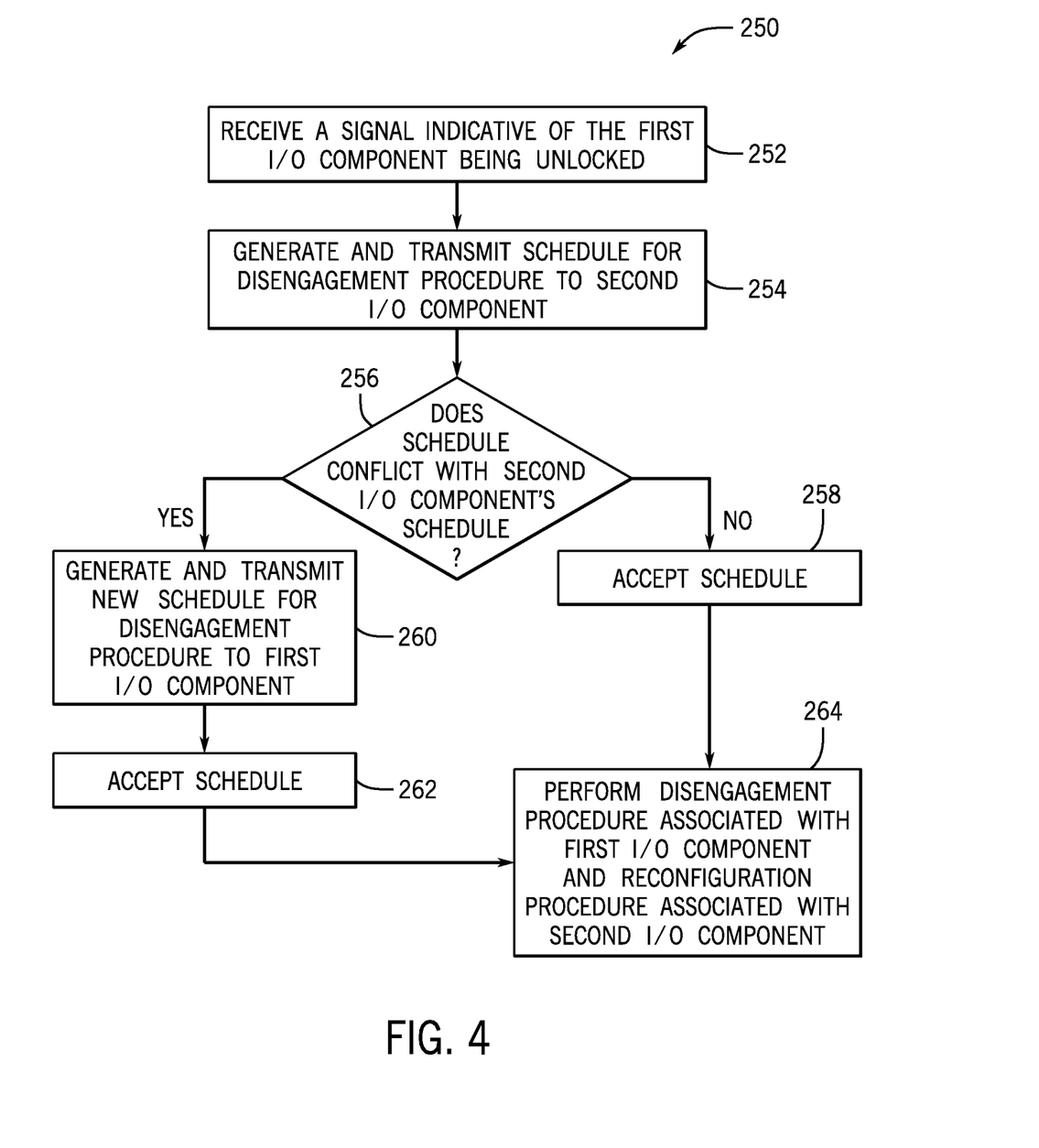
FIG. 4 is a flowchart of a method for coordinating disengagement of a first redundant I/O component of the pair of redundant I/O components of FIG. 3 and reconfiguration of a second redundant I/O component of the pair of redundant I/O components, in accordance with an embodiment.

With the foregoing in mind, FIG. 4 illustrates a flowchart of a method 250 for coordinating disengagement of the redundant I/O component 123 that has the faulty channel 206 and reconfiguration of one or more isolated channels (e.g., 203) of the redundant I/O component 123 from a duplex mode of operation to a suplex mode of operation. For example, the method 250 may be performed by the pair of redundant I/O components 122, 123 after the redundant I/O component 122 with the faulty channel 206 has received a signal indicative of its removal from the terminal block 124 but before the redundant I/O component 122 has physically been removed from the terminal block 124. In this way, the method 250 facilitates a seamless or bumpless transition in the operation of the pair of redundant I/O components 122, 123 from the duplex mode of operation to the suplex mode of operation (e.g., by the redundant I/O component 123). Although the following description of the method 250 is described in a particular order, it should be noted that the method 250 is not limited to the depicted order, and instead, the method 250 may be performed in any suitable order. Moreover, although certain blocks of the method 250 are described as being performed by the redundant I/O component 122, it should be noted that such steps may be performed by the redundant I/O component 123 if the redundant I/O component 123 has one or more faulty channels and/or is being removed from the terminal block 124. Similarly, although certain blocks of the method 250 are described as being performed by the redundant I/O component 123, it should be noted that such steps may be performed by the redundant I/O component 122 if the redundant I/O component 123 has one or more faulty channels and/or is being removed from the terminal block 124.

Referring now to FIG. 4, at block 252, the redundant I/O component 122 with the faulty channel 206 may receive a signal indicative of the redundant I/O component 122 being unlocked from the terminal block 124. In certain embodiments, a maintenance technician may turn an actuator 218 associated with the redundant I/O component 122 from a locked position (e.g., the position of actuator 219 in FIG. 3) to an unlocked position (e.g., the position of actuator 218 in FIG. 3). A sensor associated with the actuator 218 may transmit the signal indicative of the redundant I/O component 122 being unlocked from the terminal block 124 to the redundant I/O component 122. For instance, the redundant I/O component 122 may include a sensor that detects the position of the actuator 218, the terminal block 124 may include a sensor that detects the position of the actuator 218, or both. After receiving the signal indicative of the redundant I/O component 122 being unlocked from the terminal block 124, at block 254, the redundant I/O component 122 may generate a schedule for completing a disengagement procedure that disengages or decouples the redundant I/O component 122 from one or more terminals associated with the terminal block 124. For example, the redundant I/O component 122 may select a particular time or a particular period of time in which to begin the disengagement procedure. The redundant I/O component 122 may then transmit or push the schedule for the disengagement procedure to the redundant I/O component 123 without the faulty channel 206.

After receiving the schedule for the disengagement procedure, at block 256, the redundant I/O component 123 may determine whether the schedule for the disengagement procedure does not conflict with its own schedule for performing one or more operations. For instance, the redundant I/O component 123 may have one or more diagnostic operations scheduled to be performed at a particular time. If the redundant I/O component 123 determines that the schedule for the disengagement procedure does not conflict with its own schedule for performing one or more operations, the redundant I/O component 123 may accept the received schedule for the disengagement procedure at block 258. For example, the redundant I/O component 123 may transmit a signal or a message indicative of the acceptance to the redundant I/O component 122. However, if the redundant I/O component 123 determines that the schedule for the disengagement procedure conflicts with its own schedule for performing one or more operations, the redundant I/O component 123 may generate a new schedule for completing the disengagement procedure and transmit the new schedule to the redundant I/O component 122 at block 260. At block 262, after receiving the new schedule from the redundant I/O component 123, the redundant I/O component 122 may accept the new schedule. For example, the redundant I/O component 122 may transmit a signal or a message indicative of the acceptance to the redundant I/O component 123.

After the redundant I/O component 122 accepts the schedule for disengagement at block 262 or the redundant I/O component 123 accepts the schedule for disengagement at block 258, the pair of redundant I/O components 122, 123 may proceed to perform the disengagement procedure associated with the redundant I/O component 122 and the reconfiguration procedure associated with the redundant I/O component 123 at block 264. That is, at the scheduled time, the redundant I/O component 122 that has been unlocked from the terminal block 124 may perform the disengagement procedure and the redundant I/O component 123 may perform a reconfiguration procedure to switch each isolated channel of the redundant I/O component 123 from a duplex mode of operation to a suplex mode of operation.

In certain embodiments, the reconfiguration procedure associated with the redundant I/O component 123 may be performed before the disengagement procedure associated with the redundant I/O component 122. For example, after each isolated channel (e.g., 203) of the redundant I/O component 122 switches to the suplex mode of operation, the redundant I/O component 123 may transmit state or configuration data associated with the redundant I/O component 123 to the redundant I/O component 122. In certain embodiments, the state or configuration data may include Highway Addressable Remote Transducer (HART) state data. Based on the received state or configuration data, the redundant I/O component 122 may determine that the redundant I/O component 122 has taken over control of performing any specialized industrial automation input/output operations to facilitate communication with or control of the I/O device 132. The redundant I/O component 122 may then disengage or decouple from one or more terminals associated with the terminal block 124. After the redundant I/O component 122 has disengaged from the terminals, the redundant I/O component 122 may transmit state or configuration data associated with the redundant I/O component 122 to the redundant I/O component 123. In certain embodiments, the state or configuration data may include Highway HART state data. The state or configuration data may be utilized by the redundant I/O component 123 to perform one or more specialized industrial automation input/output operations.

After the disengagement procedure associated with the redundant I/O component 122 and the reconfiguration procedure associated with the redundant I/O component 123 has completed at block 264, the redundant I/O component 122 may provide an indication that the redundant I/O component 122 may be removed from the terminal block 124. In certain embodiments, the redundant I/O component 122 may display an indication via a display screen that the redundant I/O component 122 may be removed or cause a light or any other suitable indicator associated with the redundant I/O component 122 to indicate that the redundant I/O component 122 may be removed. In any case, thereafter, the maintenance technician may remove the redundant I/O component 122 from the terminal block 124leaving the redundant I/O component 123 to operate under the suplex mode of operation.

Figure 5:
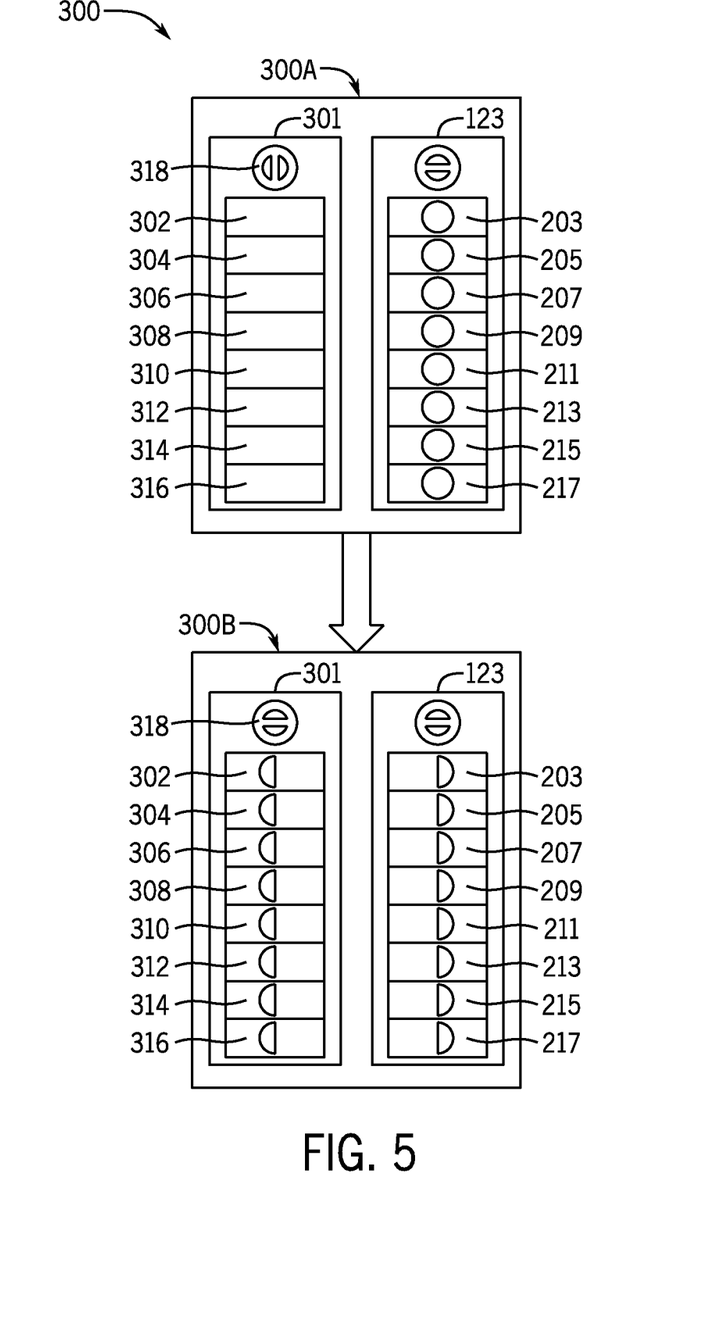
FIG. 5 is a block diagram of a reconfiguration process associated a replacement I/O component and a partner I/O component associated with the I/O system of FIG. 2, in accordance with an embodiment.

As mentioned above, the maintenance technician may replace the redundant I/O component 122 that has a faulty channel 206 with a replacement I/O component. For example, the maintenance technician may insert the replacement I/O component into the terminal block 124 to pair the replacement component I/O component with the redundant I/O component 123. With the forgoing in mind, FIG. 5 is a block diagram 300 that illustrates a reconfiguration process associated with the redundant I/O component 123 and a replacement I/O component 301 that has been inserted into the terminal block 124. As illustrated in box 300A of FIG. 5, the redundant I/O component 123 is operating under a suplex mode of operation to perform one or more specialized industrial automation input/output operations. That is, each isolated channel 203, 205, 207, 209, 211, 213, 215, 217 in the redundant I/O component 123 is operating under the suplex mode of operation. The replacement I/O component 301 may be inserted into the terminal block 124 such that each isolated channel 302, 304, 306, 308, 310, 312, 314, 316 of the replacement I/O component 301 is disengaged from the terminals of the terminal block 124.

After the replacement I/O component 301 has been inserted into the terminal block 124, the replacement I/O component 301 and the redundant I/O component 123 may perform a pairing process. For example, the replacement I/O component 301 and the redundant I/O component 123 may perform the pairing process after the maintenance technician has locked the replacement I/O component 301 into the terminal block 124. In certain embodiments, the maintenance technician may rotate an actuator 318 associated with the replacement I/O component 301 one-quarter turn to lock or unlock the replacement I/O component 301 with respect to the terminal block 124. However, it should be noted that, in other embodiments, any other suitable locking mechanism may be utilized to secure the replacement I/O component 301 to the terminal block 124. Additional details with regard to the pairing process performed by the replacement I/O component 301 and the redundant I/O component 123 are described below with respect to FIG. 6.

After the replacement I/O component 301 and the redundant I/O component 123 have been paired, the replacement I/O component 301 and the redundant I/O component 123 may switch to the duplex mode of operation to coordinate the performance of one or more specialized industrial automation input/output operations. As illustrated in box 300B in FIG. 5, each isolated channel 302, 304, 306, 308, 310, 312, 314, 316 in the replacement I/O component 301 and each isolated channel 203, 205, 207, 209, 211, 213, 215, 217 in the redundant I/O component 123 is operating under the duplex mode of operation. That is, each pair of isolated channels between the replacement I/O component 301 and the redundant I/O component 123 may coordinate operation to perform one or more specialized industrial automation input/output operations to facilitate communication between or control of the I/O device 132 by the controller 12.

Figure 6:
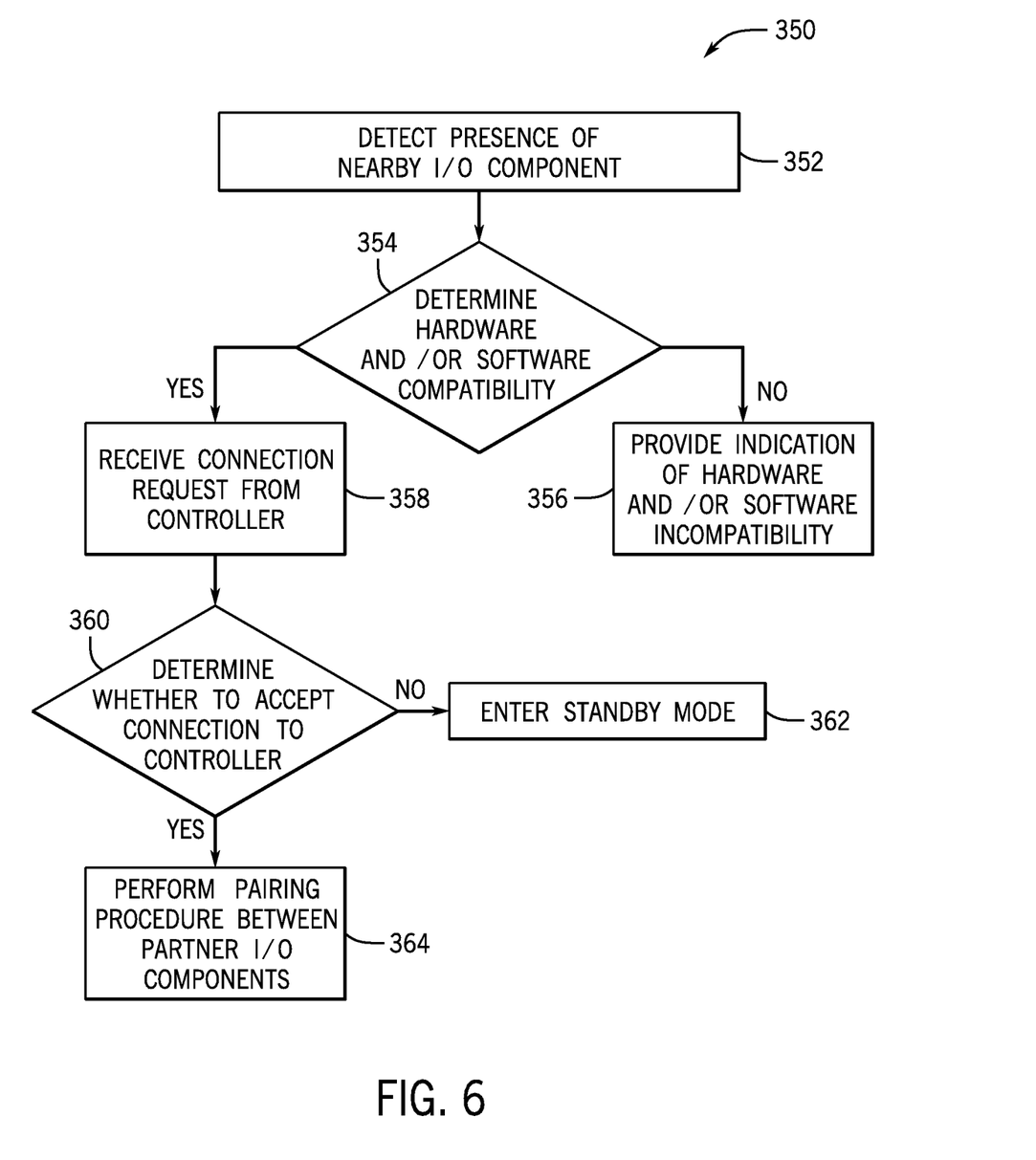
FIG. 6 is a block diagram of a pairing procedure of the replacement I/O component and the partner I/O component of FIG. 5, in accordance with an embodiment.

With the foregoing in mind, FIG. 6 illustrates a flowchart of a method 350 for pairing the replacement I/O component 301 with the redundant I/O component 123 after the replacement I/O component 301 has been inserted into the terminal block 124. Although the following description of the method 350 is described in a particular order, it should be noted that the method 350 is not limited to the depicted order, and instead, the method 350 may be performed in any suitable order. Referring now to FIG. 6, at block 352, the replacement I/O component 301 may detect the presence of the redundant I/O component 123 and/or the redundant I/O component 123 may detect the presence of the replacement I/O component 301. In certain embodiments, the replacement I/O component 301 may broadcast a signal indicative of the presence of the replacement I/O component 301 in the terminal block 124 in an area surrounding the replacement I/O component 301, the redundant I/O component 123 may broadcast a signal indicative of the presence of the redundant I/O component 123 in an area surrounding the redundant I/O component 123, or both. For example, each I/O component 123, 301 may broadcast the respective signals at a frequency greater than a scan rate of the I/O components 123, 301 or any other suitable rate.

After the replacement I/O component 301 detects the presence of the redundant I/O component 123 and/or the redundant I/O component 123 detects the replacement component 301 at block 352, the replacement I/O component 301 may verify hardware and software compatibility with the redundant I/O component 123 and/or the redundant I/O component 123 may verify hardware and software compatibility with the replacement I/O component 301. If the redundant I/O component 123 determines that the replacement I/O component 301 is not hardware and/or software compatible and/or the replacement I/O component 301 determines that the redundant I/O component 123 is not hardware and/or software compatible, at block 356, the replacement I/O component 301 may provide an indication of the hardware and/or software incompatibility. For example, the replacement I/O component 301 may provide the indication via a display, an LED, or the like.

However, if the redundant I/O component 123 determines that the replacement I/O component 301 is hardware and/or software compatible and/or the replacement I/O component 301 determines that the redundant I/O component 123 is hardware and/or software compatible, at block 358, the replacement I/O component 301 may receive a connection request from the controller 12 (i.e., the connection originator). For instance, the controller 12 may attempt to establish a connection with the replacement I/O component 301 after receiving an indication of the presence of the replacement I/O component 301 (e.g., via the backplane 128). For example, the indication may include an identifier of the replacement I/O component 301, an indication of the hardware and/or software compatibility of the replacement I/O component 301, or any other suitable information. The connection request transmitted by the controller 12 may include configuration information associated with the replacement I/O component 301 to the replacement I/O component 301. For example, the configuration information may include a mode of operation (e.g., suplex mode or duplex mode) associated with the replacement I/O component 301 and/or an identifier associated with a partner I/O component (e.g., redundant I/O component 123) for the replacement I/O component 301.

After receiving the connection request from the controller 12, at block 360, the replacement I/O component 301 may determine whether the replacement I/O component 301 may accept the connection to the controller 12 based on the received configuration information. For example, if the configuration information is indicative of the duplex mode of operation and a partner I/O component has been detected (e.g., at block 352), the replacement I/O component 301 may accept the connection to the controller 12 after verifying with the partner I/O component (e.g., the redundant I/O component 123) that the duplex configuration is correct and matches the configuration of the partner I/O component, determining whether the replacement I/O component 301 is the primary component or the secondary component in the potential pair of redundant I/O components, performing a time synchronization with the partner I/O component, or a combination thereof. Alternatively, if the configuration information is indicative of the duplex mode of operation but a partner I/O component was not detected (e.g., at block 352), the replacement I/O component 301 may accept the connection to the controller 12 after verifying that the duplex mode of operation is the correct configuration for the replacement I/O component 301. For instance, the replacement PO component 301 may transmit a request to the controller 12 to confirm the designation of the duplex mode of operation. If the controller 12 confirms that the designation of the duplex mode of operation is valid, the replacement I/O component 301 may accept the connection to the controller 12. If the controller 12 does not confirm that the designation of the duplex mode of operation is valid, the replacement I/O component 301 may not accept the connection to the controller 12 and may enter a "standby" or a "rest" mode (e.g, at block 362). Alternatively, if (1) the configuration information is indicative of the duplex configuration and the partner I/O component (e.g., redundant I/O component 123) was determined to have an incompatible hardware and/or software configuration or (2) the configuration information is indicative of the suplex configuration, the replacement I/O component 301 may accept the connection to the controller after verifying the absence of conflicts with neighboring I/O components, verifying that the suplex configuration is valid, or both. However, if one or more of the conditions described above for accepting the connection to the controller 12 are not satisfied, the replacement I/O component 301 may not accept the connection to the controller 12 and may enter a "standby" or a "rest" mode (e.g, at block 362).

After accepting the connection to the controller 12, at block 364, the replacement I/O component 301 may proceed to pair with the partner I/O component (e.g., the redundant I/O component 123) if the configuration information associated with the replacement I/O component 301 is indicative of the duplex mode of operation. In particular, the replacement I/O component 301 and the redundant I/O component 123 may negotiate a suitable time for each pair of isolated channels between the replacement I/O component 301 and the redundant I/O component 123 to switch to the duplex mode of operation. In certain embodiments, the replacement I/O component 301 may generate a schedule that defines a particular time or a particular time period for performing the pairing procedure between the replacement I/O component 301 and the redundant I/O component 123 and transmits the schedule to the redundant I/O component 123. After receiving the schedule from the replacement I/O component 301, the redundant I/O component 123 may determine whether the schedule for the pairing procedure does not conflict with its own schedule for performing one or more operations. If the redundant I/O component 123 determines that the schedule for the pairing procedure does not conflict with its own schedule for performing one or more operations, the redundant I/O component 123 may accept the received schedule for the pairing procedure. For example, the redundant I/O component 123 may transmit a signal or a message indicative of the acceptance to the replacement I/O component 301. However, if the redundant I/O component 123 determines that the pairing procedure conflicts with its own schedule for performing one or more operations, the redundant I/O component 123 may generate a new schedule for completing the pairing procedure and transmit the new schedule to the replacement I/O component 301. After receiving the new schedule from the redundant I/O component 123, the replacement I/O component 301 may accept the new schedule. For example, the replacement I/O component 301 may transmit a signal or a message indicative of the acceptance to the redundant I/O component 123.

After the redundant I/O component 123 or the replacement I/O component 301 accepts the schedule for pairing, the pair of redundant I/O components 123, 301 may proceed to perform the pairing procedure at the scheduled time. That is, at the scheduled time, the replacement I/O component 301 may engage or couple one or more terminals associated with the terminal block 124. Additionally, each pair of isolated channels between the redundant I/O component 123 and the replacement I/O component 301 may switch to a duplex mode of operation such that each pair of isolated channels may coordinate performance of a specialized industrial automation input/output operation to facilitate communication with or control of the I/O device 132 by the controller 12.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An input/output (I/O) system of an industrial automation system, comprising:
 a terminal block comprising a plurality of terminals configured to couple to respective I/O components;
 a first I/O component removably coupled to a set of terminals of the plurality of terminals; and
 a second I/O component removably coupled to the set of terminals of the plurality of terminals, wherein the first I/O component and the second I/O component are configured to operate in a duplex mode of operation;
 wherein the first I/O component is configured to perform a first set of operations, comprising:
  receiving a signal indicative of an unlocking of the first I/O component from the terminal block;
  generating a schedule for disengaging the first I/O component from the terminal block;
  transmitting the schedule to the second I/O component; and
  disengaging from the set of terminals based on the schedule; and
 wherein the second I/O component is configured to perform a second set of operations, comprising:
  receiving the schedule from the first I/O component; and
  reconfiguring the second I/O component to operate in a single duplex ("suplex") mode of operation.

2. The I/O system of claim 1, wherein the first I/O component comprises a first set of isolated channels and the second I/O component comprises a second set of isolated channels.

3. The I/O system of claim 1, wherein the second set of operations comprises:
  determining that the schedule conflicts with one or more operations associated with the second I/O component;
  generating a new schedule for disengaging the first I/O component from the terminal block; and
  transmitting the new schedule to the first I/O component.

4. The I/O system of claim 3, wherein the first set of operations comprises:
  receiving the new schedule from the second I/O component; and
  disengaging from the set of terminals based on the new schedule.

5. The I/O system of claim 1, comprising an actuator configured to lock or unlock the first I/O component with respect to the terminal block.

6. The I/O system of claim 5, comprising a sensor configured to detect a position of the actuator, wherein the actuator is configured to be disposed in a locked position or an unlocked position.

7. The I/O system of claim 6, wherein the signal indicative of the unlocking of the first I/O component from the terminal block is received from the sensor.

8. A method, comprising:
  receiving, by a first input/output (I/O) component removably coupled to a terminal block, a signal indicative of an unlocking of the first I/O component from the terminal block;
  generating, by the first I/O component, a schedule for disengaging the first I/O component from the terminal block;
  transmitting, by the first I/O component, the schedule to a second I/O component;
  disengaging, by the first I/O component, from a set of terminals associated with the terminal block based on the schedule; and
  reconfiguring, by the second I/O component, an operational configuration associated with the second I/O component to a single duplex ("suplex") mode of operation based on the schedule.

9. The method of claim 8, wherein the operational configuration associated with the second I/O component is reconfigured from a duplex mode of operation to the suplex mode of operation.

10. The method of claim 8, wherein an isolated channel of the first I/O component experienced a fault before the first I/O component received the signal indicative of the unlocking of the first I/O component from the terminal block.

11. The method of claim 8, comprising detecting, by the second I/O component, a third I/O component removably coupled to the terminal block.

* * * * *